United States Patent
Iriyama et al.

(10) Patent No.: US 11,431,686 B2
(45) Date of Patent: Aug. 30, 2022

(54) ENCRYPTED DATA PROCESSING SYSTEM AND PROGRAM

(71) Applicant: Tokyo University of Science Foundation, Tokyo (JP)

(72) Inventors: Satoshi Iriyama, Tokyo (JP); Maki Kihara, Tokyo (JP)

(73) Assignee: Tokyo University of Science Foundation, Tokyo (JP)

( * ) Notice: Subject to any disclaimer, the term of this patent is extended or adjusted under 35 U.S.C. 154(b) by 169 days.

(21) Appl. No.: 16/955,739

(22) PCT Filed: Dec. 11, 2018

(86) PCT No.: PCT/JP2018/045505
§ 371 (c)(1),
(2) Date: Jun. 18, 2020

(87) PCT Pub. No.: WO2019/124164
PCT Pub. Date: Jun. 27, 2019

(65) Prior Publication Data
US 2021/0105255 A1    Apr. 8, 2021

(30) Foreign Application Priority Data

Dec. 22, 2017 (JP) .............................. JP2017-246716

(51) Int. Cl.
*H04L 9/40* (2022.01)
*G06F 21/60* (2013.01)
(Continued)

(52) U.S. Cl.
CPC ........ *H04L 63/0428* (2013.01); *G06F 21/602* (2013.01); *H04L 9/0894* (2013.01);
(Continued)

(58) Field of Classification Search
CPC ..... H04L 63/0428; H04L 9/0894; H04L 9/14; H04L 9/3228; H04L 9/3234;
(Continued)

(56) References Cited

U.S. PATENT DOCUMENTS

2009/0287930 A1* 11/2009 Nagaraja ................... H04L 9/08
                                                          713/171
2015/0046708 A1*  2/2015 Yasuda .................... H04L 9/008
                                                          713/168

(Continued)

FOREIGN PATENT DOCUMENTS

| JP | 2001-042938 A | 2/2001 |
| JP | 2005-130384 A | 5/2005 |

(Continued)

OTHER PUBLICATIONS

Mar. 19, 2019 (WO)—International Search Report and Written Opinion of the ISA issued in International Application No. PCT/JP2018/045505.

(Continued)

*Primary Examiner* — Henry Tsang
(74) *Attorney, Agent, or Firm* — Banner & Witcoff, Ltd.

(57) ABSTRACT

An encrypted data processing system is provided including an encryption device and a server. The encryption device includes an encrypting section that encrypts first information based on a first encryption key and transmits the encrypted information for registration to the server, and encrypts second information based on a second encryption key and transmits the encrypted information to be compared to the server. The server includes a comparison section that employs a cipher comparison function for comparing encrypted information to compare the encrypted information for registration against the encrypted information to be compared, and transmits a comparison result to the encryption device. The encryption device further includes a com- (Continued)

parison result decrypting section that employs a decryption function for decrypting the comparison result with the first encryption key and the second encryption key to find a degree of matching between the first information and the second information.

8 Claims, 8 Drawing Sheets

(51) Int. Cl.
*H04L 9/08* (2006.01)
*H04L 9/14* (2006.01)
*H04L 9/32* (2006.01)

(52) U.S. Cl.
CPC .............. *H04L 9/14* (2013.01); *H04L 9/3228* (2013.01); *H04L 9/3234* (2013.01)

(58) Field of Classification Search
CPC ... H04L 63/0435; H04L 63/123; H04L 9/008; H04L 63/067; H04L 63/126; G06F 21/602; G06F 16/00
See application file for complete search history.

(56) References Cited

U.S. PATENT DOCUMENTS

| | | | | |
|---|---|---|---|---|
| 2015/0195090 A1* | 7/2015 | Obana | ................ | H04L 9/0841 380/30 |
| 2015/0207630 A1* | 7/2015 | Shimoyama | ....... | G06Q 20/3823 713/186 |
| 2015/0281188 A1* | 10/2015 | Sakemi | .................... | H04L 9/14 713/171 |
| 2016/0173275 A1 | 6/2016 | Yasuda et al. | | |

FOREIGN PATENT DOCUMENTS

| | | | |
|---|---|---|---|
| JP | 2007-318518 A | | 12/2007 |
| JP | 2015-192352 A | | 11/2015 |
| JP | 2015-192446 A | | 11/2015 |
| JP | 2015192352 A | * | 11/2015 |
| JP | 2015-225343 A | | 12/2015 |
| JP | 2016-111594 A | | 6/2016 |
| JP | 2016-114692 A | | 6/2016 |
| JP | 2017-021330 A | | 1/2017 |
| JP | 2017-021331 A | | 1/2017 |

OTHER PUBLICATIONS

Mar. 24, 2020 (WO)—International Preliminary Report on Patentability issued in International Application No. PCT/JP2018/045505.

* cited by examiner

| ID | ENCRYPTION KEY |
|---|---|
| 123A1 | DATA OF ENCRYPTION KEY $k_1$ ASSOCIATED WITH ID |
| 123A2 | DATA OF ENCRYPTION KEY $k_1$ ASSOCIATED WITH ID |
| 125A3 | DATA OF ENCRYPTION KEY $k_1$ ASSOCIATED WITH ID |
| ... | ... |

232A

| ID | ENCRYPTION KEY |
|---|---|
| 123A1 | DATA OF ENCRYPTION KEY $k_2$ ASSOCIATED WITH ID |
| ... | ... |

232B

ENCRYPTED DATA PROCESSING SYSTEM AND PROGRAM

ENCRYPTED DATA PROCESSING SYSTEM AND PROGRAM

Cross-Reference To Related Applications

This application is a National Stage Application under 35 U.S.C. 371 of PCT application number PCT/JP2018/045505 designating the United States and filed Dec. 11, 2018, which claims the benefit of JP application number 2017-246716 and filed Dec. 22, 2017, each of which is hereby incorporated by reference in its entirety.

TECHNICAL FIELD

The present disclosure relates to an encrypted data processing system and program, and in particular relates to an encrypted data processing system and program for comparing input information.

BACKGROUND ART

Technology has previously been developed for processing encrypted information.

For example, there is technology to improve security by encryption using two encryption keys when encrypting information and communicating between a client terminal and a database server (Japanese Patent Application Laid-Open (JP-A) No. 2007-318518).

There is also technology to prevent unauthorized manipulation by double encrypting registration data to generate and register encrypted data (JP-A No. 2015-192446).

There is also technology in which biometric feature data for comparison and registered biometric feature data are compared/cross-checked, and a security code is transmitted from a mobile phone device to a management server as long as a specific matching condition is satisfied (re-published patent publication 2001-42938).

There is also technology that utilizes relational encryption technology or the like to perform user authentication by comparing the similarities between a ciphertext and a registered ciphertext (JP-A Nos. 2015-225343, 2017-21330, and 2017-21331).

SUMMARY OF INVENTION

Technical Problem

However, although hitherto comparison has been achievable without decrypting encrypted information, there has been no secrecy for the comparison result.

In consideration of the above circumstances, an object of the present disclosure is to provide an encrypted data processing system and program to improve the secrecy when comparing input information.

Solution to Problem

A first aspect of the present disclosure is an encrypted data processing system including a server and an encryption device connected to the server over the Internet. The encryption device includes an encrypting section that encrypts input first information based on a first encryption key so as to generate encrypted information for registration and transmits the generated encrypted information for registration to the server, and encrypts input second information based on a second encryption key so as to generate encrypted information to be compared and transmits the generated encrypted information to be compared to the server. The server includes a comparison section that employs a cipher comparison function for comparing encrypted information to compare the encrypted information for registration against the encrypted information to be compared, and transmits a comparison result to the encryption device. The encryption device further includes a comparison result decrypting section that employs a decryption function for decrypting the comparison result with the first encryption key and the second encryption key to find a degree of matching between the first information and the second information.

A second aspect of the present disclosure is the encrypted data processing system of the first aspect wherein the second encryption key is a one-time key.

A third aspect of the present disclosure is the encrypted data processing system of the first or the second aspect, wherein the first information and the second information are information obtained with a reading device for reading a magnetic card, biometric information, or an output signal of an information terminal.

A fourth aspect of the present disclosure is the encrypted data processing system of any one of the first to the third aspects, wherein the first information and the second information are hashed data.

A fifth aspect of the present disclosure is the encrypted data processing system of any one of the first to the fourth aspects, wherein the encrypting section of the encryption device associates an arbitrary registration ID corresponding to the first information with the encrypted information for registration and transmits these to the server, and associates the registration ID with the encrypted information to be compared and transmits these to the server. The server further includes a registration information storage section that stores the received registration ID and the received encrypted information for registration associated with each other. The comparison section of the server reads from the registration information storage section the encrypted information for registration associated with the registration ID that has been associated with the received encrypted information to be compared, compares the read encrypted information for registration against the encrypted information to be compared, and transmits a comparison result to the encryption device.

A sixth aspect of the present disclosure is the encrypted data processing system of the fifth aspect, wherein the encryption device further includes a key storage section in which the first encryption key and the second encryption key are stored associated with the registration ID, and the comparison result decrypting section employs a decryption function for decrypting the comparison result with the first encryption key and the second encryption key corresponding to the registration ID for which the comparison result was found to find a degree of matching between the first information and the second information.

A seventh aspect of the present disclosure is an encrypted data processing method performed by an encryption device. In this encrypted data processing method the encryption device encrypts input first information based on a first encryption key so as to generate encrypted information for registration and transmits this to a server, and encrypts input second information based on a second encryption key so as to generate encrypted information to be compared and transmits this to the server. The encryption device receives from the server a comparison result from employing a cipher comparison function for comparing encrypted information to compare the encrypted information for registration against the encrypted information to be compared. The encryption device employs a decryption function for decrypting the comparison result with the first encryption key and the second encryption key to find a degree of matching between the first information and the second information.

An eighth aspect of the present disclosure is a program to cause a computer serving as an encryption device to execute processing. The processing includes: encrypting input first information based on a first encryption key so as to generate encrypted information for registration and transmitting this to a server; encrypting input second information based on a second encryption key so as to generate encrypted information to be compared and transmitting this to the server; receiving from the server a comparison result from employing a cipher comparison function for comparing encrypted information to compare the encrypted information for registration against the encrypted information to be compared; and employing a decryption function for decrypting the comparison result with the first encryption key and the second encryption key to find a degree of matching between the first information and the second information.

Advantageous Effects

The encrypted data processing system of the present disclosure is an encrypted data processing system including a server and an encryption device connected to the server over the Internet. The encryption device includes an encrypting section that encrypts input first information based on a first encryption key so as to generate encrypted information for registration and transmits this to the server, and encrypts input second information based on a second encryption key so as to generate encrypted information to be compared and transmits this to the server. The server includes a comparison section that employs a cipher comparison function for comparing encrypted information to compare the encrypted information for registration against the encrypted information to be compared, and transmits a comparison result to the encryption device. The encryption device further includes a comparison result decrypting section that employs a decryption function for decrypting the comparison result with the first encryption key and the second encryption key to find a degree of matching between the first information and the second information. By adopting such a configuration the encrypted data processing system of the present disclosure is able to compare encrypted information without decrypting and is able to improve the secrecy when comparing input information.

DESCRIPTION OF EMBODIMENTS

Detailed explanation follows regarding exemplary embodiments of the present disclosure, with reference to the drawings.

Outline of Exemplary Embodiments of Present Disclosure

First, explanation follows regarding the background to arriving at the proposed technology of the exemplary embodiments of the present disclosure.

Recently a problem of how to perform searching and processing of encrypted information without decrypting (searchable secure encryption, SSE) has become a topic of interest. Various enterprises have performed research into this topic in Japan. Development aimed at improving processing speeds by using technology that performs processing by attaching tags to encrypted information is progressing. However, since the tag information itself is not able to be made secret, comprehensive security is not secured. Moreover, although technology is being developed that employs a homomorphic encryption function such as is employed in RSA, processing speeds are extremely slow, and such technology is not easily put into practice. Although there is a global trend towards a Pailler cryptosystem, which is an example of a somewhat homomorphic encryption, there are also concerns regarding the internal state required of a memory area that is several thousands of times the input, and concerns regarding processing speeds and the like thereof.

In light of the above circumstances, an object of the technology according to exemplary embodiments of the present disclosure is to improve processing speed and security, and to reduce internal memory in a single solution proposed for SSE technology. This technology is fundamental technology to the field of processing information while still encrypted, and is applicable in practice to various applications.

The technology according to exemplary embodiments of the present disclosure is technology in which two items of information are encrypted and then compared without decrypting the two items of information. This enables protection of biometric information, protection of personal information such as card numbers, and manipulation prevention for texts to be performed more safely and at higher processing speeds.

Principles of Exemplary Embodiments of Present Disclosure

First the principles of exemplary embodiments of the present disclosure will be described.

As described below, the technology of exemplary embodiments of the present disclosure may be divided into a step 1 (registration) and a step 2 (comparison).

First, the notation and each function employed in the exemplary embodiments of the present disclosure will be described.

P is plaintext space and represents the space of subject information.

$p_1, p_2 \in P$ are plaintext 1 and plaintext 2, and represent subject information 1 and subject information 2. K is key space, and represents the space of keys employed for encryption. $k_1, k_2 \in K$ are a key 1 and a key 2, and represent keys employed in encryption. C represents the space of ciphertext.

$E_k: P \rightarrow C$ represents an encryption function to generate ciphertext using plaintext and a key k.

$D_k: C \rightarrow P$ represents a decryption function to decrypt ciphertext into plaintext using a key k.

$$g: P \times P \rightarrow \mathbb{Z}$$

represents a comparison function.

The comparison function compares two items of information, and is a function that returns zero when there is a match, and returns a non-zero integer when there is no match.

$F: C \times C \rightarrow C$ represents a cipher comparison function, and is a function for comparing two items of encrypted information and returns ciphertext. The cipher comparison function satisfies the following relationships.

$$D_{k_1,k_2}(F(c_1,c_2)) = g(p_1,p_2)$$

wherein, $$E_{k_1}(p_1) = c_1, E_{k_2}(p_2) = c_2$$

Next, explanation follows regarding step 1 (registration) and step 2 (comparison).

Figure 1:
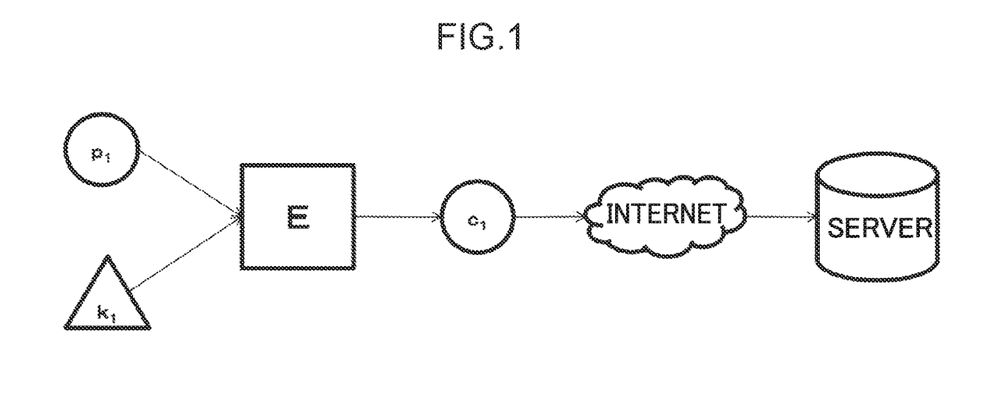
FIG. 1 is a diagram schematically illustrating registration processing.

An outline diagram of step 1 (registration) is illustrated in FIG. 1. In step 1 (registration) a user employs a generated key $k_1$ on information 1 (plaintext $p_1$) to compute the encryption function of Equation (1) below, and transmits encrypted information for registration $c_1$ to the server.

$$E(k_1,p_1) = k_1 \oplus p_1 = c_1 \quad (1)$$

wherein
$\oplus$
represents an XOR operation for each bit.

The communication path to the server may be a public communication path. The key ($k_1$) is a generated key such as a pseudo random number or the like, and the user keeps the key ($k_1$) secret. Moreover, a unique ID is issued for each registration and is associated with the encrypted information for registration $c_1$.

Figure 2:
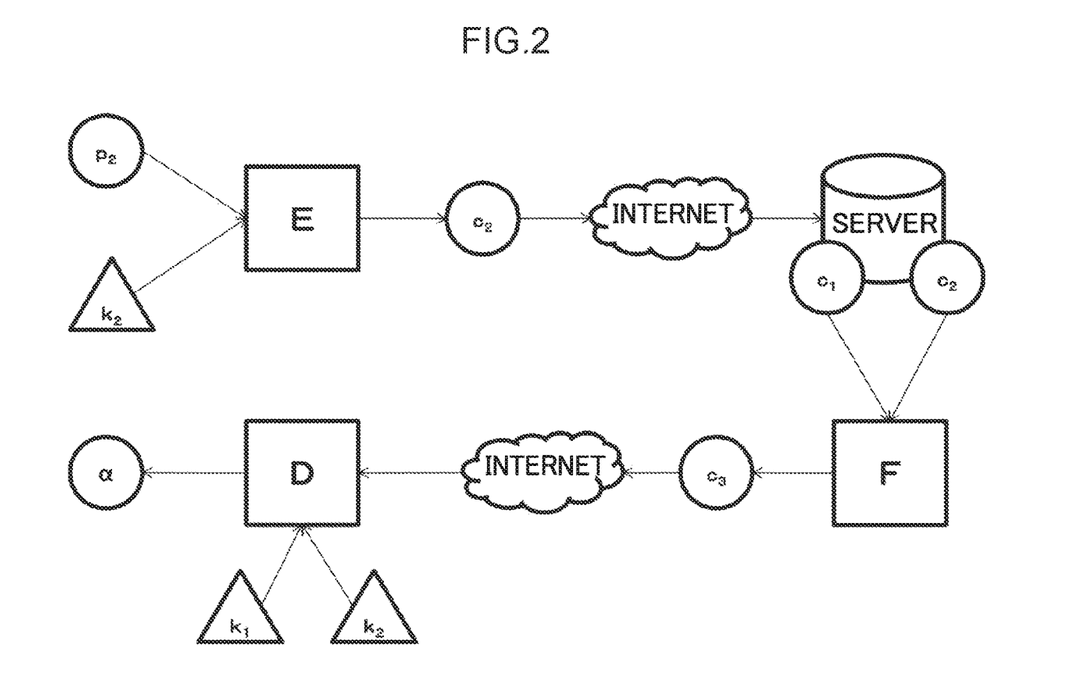
FIG. 2 is a diagram schematically illustrating comparison processing.

An outline diagram of step 2 (comparison) is illustrated in FIG. 2. At step 2 (comparison), a user employs a generated key $k_2$ on information 2 (plaintext $p_2$) to compute the encryption function of Equation (2) below and transmits encrypted information for comparison $c_2$ to the server.

$$E(k_2,p_2) = k_2 \oplus p_2 = c_2 \quad (2)$$

The key ($k_2$) is a key such as a pseudo random number or the like generated for every comparison, and the user keeps the key ($k_2$) secret until a comparison result is obtained. Moreover, the ID from registration is associated with the encrypted information for comparison $c_2$.

The server computes the cipher comparison function F of Equation (3) below and returns an encrypted comparison result $c_3$ to the user.

$$\begin{aligned} F(c_1, c_2) &= c_1 \oplus c_2 \\ &= k_1 \oplus p_1 \oplus k_2 \oplus p_2 = c_3 \end{aligned} \quad (3)$$

The communication path therefor may be a public communication path.

The user then employs the key $k_1$ and the key $k_2$ on the encrypted comparison result $c_3$ to compute the decryption function D of Equation (4) below, and obtains comparison result $\alpha$.

$$\begin{aligned} D_{k_1,k_2} &= (c_3) \\ &= k_1 \oplus k_2 \oplus c_3 \\ &= k_1 \oplus k_2 \oplus k_1 \oplus k_2 \oplus p_1 \oplus p_2 \\ &= p_1 \oplus p_2 = \alpha \end{aligned} \quad (4)$$

This concludes the explanation of the principles of the technology employed in the exemplary embodiments of the present disclosure.

Configuration of Encrypted Data Processing System According to First Exemplary Embodiment of Present Disclosure Next, explanation follows regarding a configuration of an encrypted data processing system according to a first exemplary embodiment of the present disclosure. The first exemplary embodiment will be described for an example of an application in a facility such as a hotel, in which an encryption device and a reading device are each provided at the doors of each room to manage access to the rooms.

Figure 3:
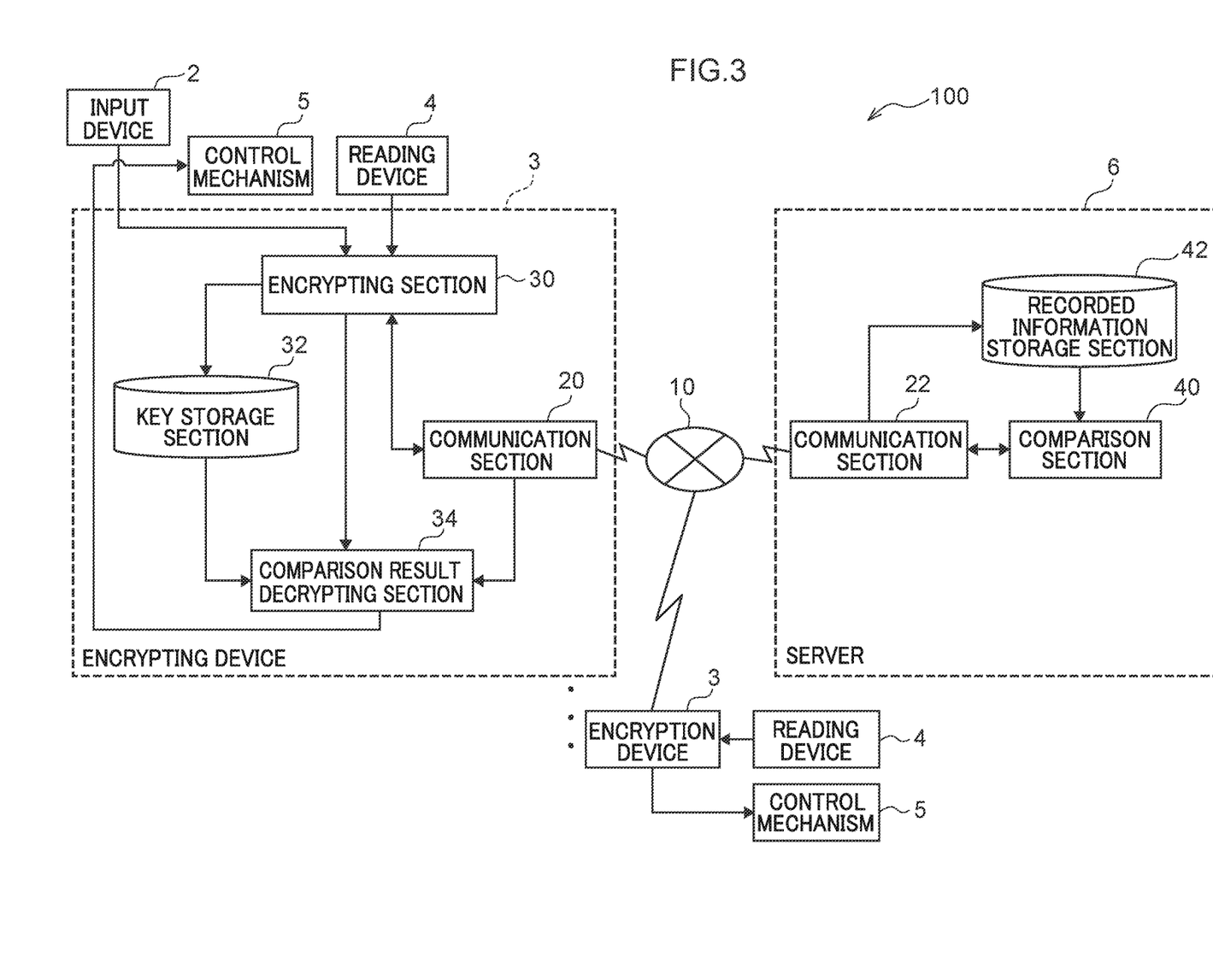
FIG. 3 is a block diagram illustrating a configuration of an encrypted data processing system according to a first exemplary embodiment of the present disclosure.

As illustrated in FIG. 3, the encrypted data processing system 100 according to the first exemplary embodiment of the present disclosure includes an input device 2, an encryption device 3, a reading device 4, a control mechanism 5, and a server 6. The encryption device 3 and the server 6 are connected together over a network 10, such as the Internet.

The input device 2 is, for example, a terminal held by staff of the hotel, and when registering encrypted information, information on a magnetic card (hereafter referred to as first information ($p_1$)) that has been read by a reading device (not illustrated in the drawings) provided on the user-side for a hotel user who has made a hotel booking is transmitted to the encryption device 3 provided on the door of the room allocated to the hotel user. Note that the information of the magnetic card there has been read by the reading device (not illustrated in the drawings) provided on the hotel user-side is acquired over the network 10.

The reading device 4 is a device installed on the door of each room to read the magnetic card data. When comparing the encrypted information, the reading device 4, for example, reads information on the magnetic card waved by the hotel user (hereafter referred to as second information ($p_2$)) as information for comparison, and transmits the read second information ($p_2$) to the encryption device 3.

Note that the reading device 4 may be a device to read biometric information, an output signal from a smartphone, or the like. In such cases, the information such as the biometric information, the output signal from a smartphone, or the like is transmitted as the first information and the second information to the encryption device 3.

Next, explanation follows regarding the encryption device 3.

The encryption device 3 is configured including a communication section 20, an encrypting section 30, a key storage section 32, and a comparison result decrypting section 34. In the present exemplary embodiment, the encryption device 3 is a device installed to each room. Note that the encryption device 3 may, for example, be implemented by a computer. Such a computer includes a central processing unit (CPU), a memory serving as a temporary storage area, and a non-volatile storage section. The computer also includes an input/output interface (I/F), a read/write (R/W) section to control the reading and writing of data to a storage medium, and a network interface (I/F) connected to a network, such as the Internet. The storage section may be implemented by a hard disk drive (HDD), a solid state drive (SSD), flash memory, or the like. A program to cause the computer to function as the encryption device 3 is stored in the storage section, serving as a storage medium. The CPU reads the program stored in the storage section, expands the program into the memory, and sequentially executes each of the processes of the program. The CPU operates as the communication section 20, the encrypting section 30, and the comparison result decrypting section 34 illustrated in FIG. 3 by executing each of the processes of the program.

The communication section 20 transmits the encrypted information for registration and the registration ID, together with a register command, to the server 6 over the network 10. The communication section 20 transmits the encrypted information for comparison and the registration ID together with a compare command. The communication section 20 receives, from the server 6, the encrypted comparison result and the registration ID of the comparison performed.

The encrypting section 30 receives the first information ($p_1$) from the input device 2, generates a first encryption key ($k_1$), and then based on the first encryption key ($k_1$), employs the encryption function E of Equation (1) to encrypt the first information ($p_1$) and to generate encrypted information for registration ($c_1$). The encrypting section 30 also generates a registration ID for each time of encrypted information registration. The registration ID may, for example, be generated by using a pre-set room number, such as "room number+registration number" or the like. The registration number is a number to enable discrimination of the information ($p_1$) and may, for example, be a hash of the read information ($p_1$) such as "A1", "A2", etc. The encrypting section 30 associates the generated encrypted information ($c_1$) with the registration ID and transmits these together with a register command to the server 6. The first encryption key ($k_1$) and the registration ID are associated with each other and saved in a storage table 32A of the key storage section 32. Note that due to the room numbers being set for each of the rooms in advance, the room number may be omitted from the registration ID. Moreover, there is no limitation using the room number to generate the registration ID, and unique information extracted from facility information may be employed therefor. Conceivable examples of such unique information include, for example, position information, a phone number, or the like.

Moreover, on receipt of the second information ($p_2$) from the reading device 4, the encrypting section 30 generates a second encryption key for comparison ($k_2$), and then, based on the second encryption key for comparison ($k_2$), employs the encryption function E of Equation (2) to encrypt the second information ($p_2$) and to generate encrypted information for comparison ($c_2$). The second encryption key for comparison is a one-time key, and is only valid when comparison is being performed. The encrypting section 30 then associates the generated encrypted information ($c_2$) with the registration ID saved in the key storage section 32, and transmits these together with a compare command to the server 6. The second encryption key for comparison ($k_2$) is saved in a storage table 32B of the key storage section 32.

Figure 4:
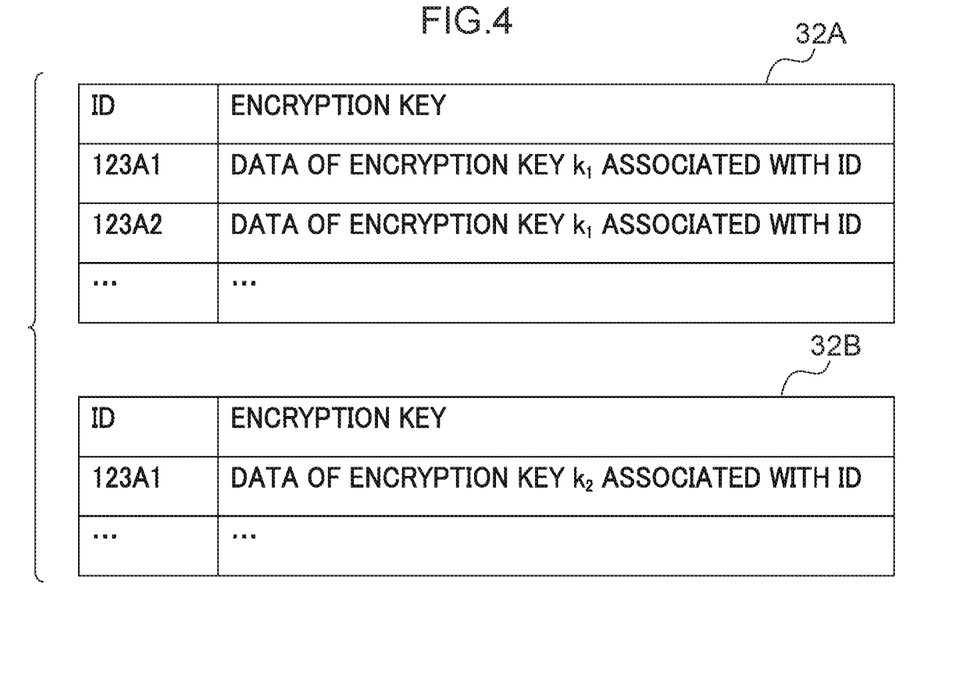
FIG. 4 is a diagram illustrating an example of information stored in a key storage section 32 of the first exemplary embodiment.

The key storage section 32 is a section for storing the first encryption key ($k_1$) associated with a registration ID, and for storing the second encryption key for comparison ($k_2$) associated with a registration ID. An example of the storage table 32A for the first encryption key ($k_1$) of the key storage section 32 is illustrated in FIG. 4. A registration ID "123A1" and encryption key are stored as the first record. "123" in the registration ID represents the room number, and "A1" therein represents the registration number. An example of the storage table 32B for the second encryption key for comparison ($k_2$) is also illustrated in FIG. 4. The storage table 32B has a similar configuration to the storage table 32A, and is a table to temporarily store the second encryption key for comparison ($k_2$) as a one-time key, until the comparison result is obtained in the comparison result decrypting section 34. The record of the second encryption key for comparison ($k_2$) that is being stored as a one-time key is accordingly deleted after comparison.

The comparison result decrypting section 34 employs the first encryption key ($k_1$) and the second encryption key for comparison ($k_2$), and employs the decryption function D of Equation (4) to decrypt the encrypted comparison result ($c_3$) received from the server 6 to obtain a decrypted comparison result α, and thereby finds the degree of matching between the first information and the second information. A configuration may be adopted in which the first encryption key and the second encryption key are referenced and read for the records in the storage table 32A and the storage table 32B of the key storage section 32 having the registration ID received from the server 6 that correspond to the registration ID when comparison was performed, so as to employ these encryption keys in decryption.

In cases in which the decrypted comparison result indicates the first information and the second information match, i.e. the decrypted comparison result α is 0, for example, then the comparison result decrypting section 34 sends an unlock notification to the control mechanism 5, so as to notify unlocking of the lock on the door of the room. However, in cases in which the decrypted comparison result α is 1 or more, i.e. the first information and the second information do not match, then the comparison result decrypting section 34 sends a notification of an error to the control mechanism 5 so as not to unlock the lock of the room. The comparison result decrypting section 34 also deletes the record of the second encryption key for comparison ($k_2$) stored as a one-time key in the storage table 32B of the key storage section 32.

On receiving the notification to unlock the lock or the notification of an error from the comparison result decrypting section 34, the control mechanism 5 either unlocks the lock on the door or notifies that it is unable to unlock using an error sound or the like. In this manner the control mechanism 5 is a functional section to perform authentication processing based on the comparison result from the comparison result decrypting section 34.

Next, explanation follows regarding the server 6.

The server 6 is configured including a communication section 22, a comparison section 40, and a registration information storage section 42. Note that similarly to the encryption device 3, the server 6 may also be configured by a computer. When configured by such a computer, a CPU operates as the communication section 22 and the comparison section 40 illustrated in FIG. 3 by executing each process of a program.

The communication section 22 receives from the encrypting device 3 over the network 10 a register command together with the encrypted information for registration ($c_1$) and the registration ID. The encrypted information for registration and the registration ID are stored in the registration information storage section 42 in cases in which the register command is received. The communication section 22 also receives a compare command together with the encrypted information for comparison ($c_2$) and the registration ID. In cases in which the compare command is received, the communication section 22 inputs the encrypted information for comparison ($c_2$) and the registration ID to the comparison section 40. The communication section 22 also transmits the encrypted comparison result ($c_3$) obtained by the comparison section 40 and the registration ID for the comparison performed to the encryption device 3.

Figure 5:
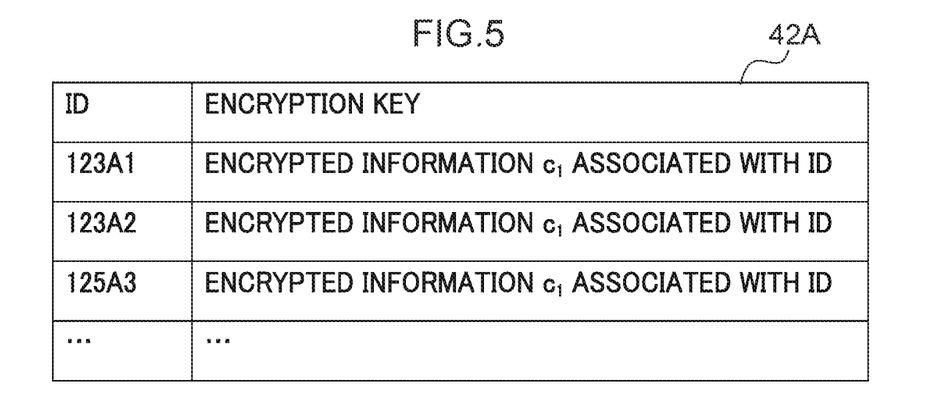
FIG. 5 is a diagram illustrating an example of information stored in a registration information storage section 42.

The registration information storage section 42 stores the received encrypted information for registration and the registration ID in a format in which the registration ID and the encrypted information are associated with each other. An example of a storage table 42A of the registration information storage section 42 is illustrated in FIG. 5. As illustrated in FIG. 5, the registration ID "123A1" and the encrypted information are stored as a first record.

The comparison section 40 uses the received registration ID to read the encrypted information for registration ($c_1$) of the record having a room number matching the registration ID of the registration information storage section 42, and employs the cipher comparison function F for comparing encrypted information of Equation (3) to compare the read encrypted information for registration ($c_1$) against the encrypted information to be compared ($c_2$), and obtains the encrypted comparison result ($c_3$). The encrypted comparison result ($c_3$) and the registration ID of the comparison performed are transmitted to the encryption device 3.

Operation of Encrypted Data Processing System According to First Exemplary Embodiment of Present Disclosure Next, explanation follows regarding operation of the encrypted data processing system according to the first exemplary embodiment of the present disclosure.

The operation of the encryption device 3 will be explained with reference to FIG. 6 and FIG. 7. The operation of the server 6 will be explained with reference to FIG. 8 and FIG. 9.

Figure 6:
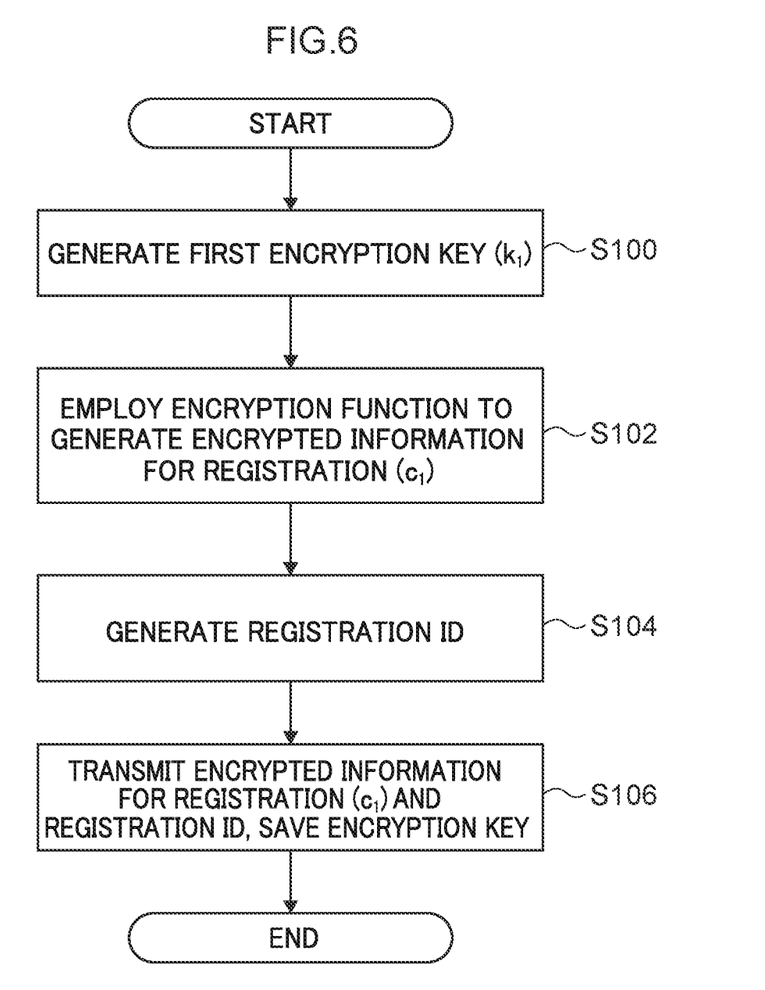
FIG. 6 is a diagram illustrating an example of a registration processing routine of an encryption device according to an exemplary embodiment of the present disclosure.

On receipt of the first information ($p_1$) from the input device 2, the encryption device 3 executes the registration processing routine illustrated in FIG. 6. On receipt of the second information ($p_2$) from the reading device 4, the encryption device 3 executes the comparison processing routine illustrated in FIG. 7. Note that in cases in which the encryption device 3 is configured by a computer, the processing of each of the following steps may be implemented by the CPU reading a specific program stored in the above storage section, and executing each process of the program.

First the registration processing routine of FIG. 6 will be described.

At step S100, the encrypting section 30 generates a first encryption key ($k_1$) using a pseudo random number.

At step S102, based on the first encryption key ($k_1$) generated at step S100, the encrypting section 30 employs the encryption function E of Equation (1) to encrypt the first information ($p_1$) and generate the encrypted information for registration ($c_1$).

At step S104, the encrypting section 30 uses the pre-set room number to generate a registration ID.

At step S106, the encrypting section 30 associates the encrypted information ($c_1$) generated at step S102 with the registration ID generated at step S104, and transmits these together with a register command to the server 6, and associates the first encryption key ($k_1$) with the registration ID and saves these in the storage table 32A of the key storage section 32, before ending processing.

Figure 7:
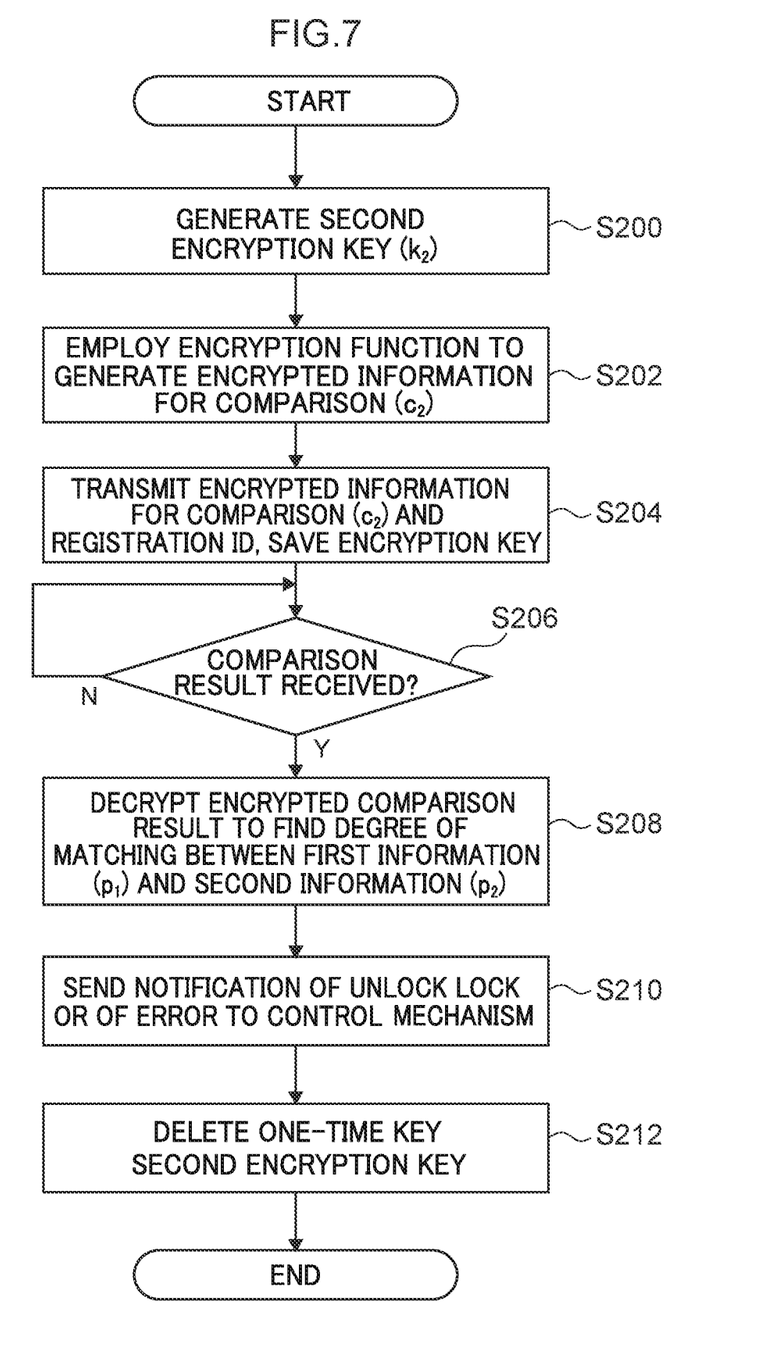
FIG. 7 is a diagram illustrating an example of a comparison processing routine of an encryption device according to an exemplary embodiment of the present disclosure.

Next, explanation follows regarding the comparison processing routine of FIG. 7.

At step S200, the comparison result decrypting section 34 generates the second encryption key for comparison ($k_2$) using a pseudo random number.

At step S202, based on the second encryption key for comparison ($k_2$) generated at step S200, the comparison result decrypting section 34 employs the encryption function E of Equation (1) to encrypt the second information ($p_2$) read by the reading device 4 to generate the encrypted information for comparison ($c_2$).

At step S204, the comparison result decrypting section 34 associates the encrypted information ($c_2$) generated at step S202 with the room number and the registration ID saved in the key storage section 32, and transmits these together with a compare command to the server 6, and associates the second encryption key ($k_2$) with the registration ID and saves these in the storage table 32B of the key storage section 32.

At step S206, the comparison result decrypting section 34 determines whether or not a comparison result has been received from the server 6. Processing transitions to step S208 when received, and the step S206 is repeated if not received.

At step S208, the comparison result decrypting section 34 employs the decryption function D of Equation (4) with the first encryption key ($k_1$) and the second encryption key for comparison ($k_2$) that are saved in the key storage section 32 to obtain the comparison result α from decrypting the encrypted comparison result ($c_3$) received from the server 6. This thereby finds the degree of matching between the first information and the second information.

At step S210, the comparison result decrypting section 34 sends a notification of unlock the lock or a notification of an error to the control mechanism 5 according to the decrypted comparison result α.

At step S212, the comparison result decrypting section 34 deletes the record of the second encryption key for comparison ($k_2$) stored as a one-time key in the storage table 32B, and then ends processing.

Next, explanation follows regarding operation of the server 6.

Figure 8:
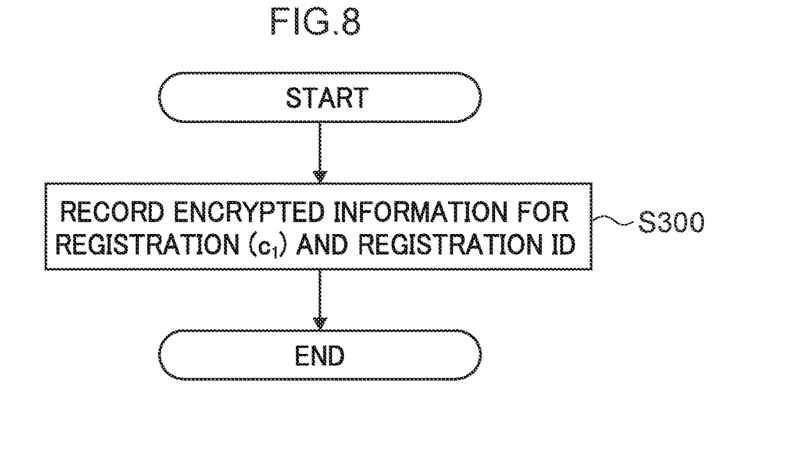
FIG. 8 is a diagram illustrating an example of a registration processing routine of a server according to an exemplary embodiment of the present disclosure.

Explanation follows regarding the registration processing routine of the server 6. Note that in cases in which the server 6 is configured by a computer, the processing of each of the following steps may be implemented by the CPU reading a specific program stored in the above storage section, and executing each process of the program.

On receipt of the encrypted information for registration ($c_1$) and the registration ID together with the register command, the server 6 executes the registration processing routine illustrated in FIG. 8.

At step S300, on receipt by the communication section 22 of the encrypted information for registration ($c_1$) and the registration ID, together with the register command, the encrypted information for registration ($c_1$) and the registration ID are stored in the registration information storage section 42, and then processing is ended.

Figure 9:
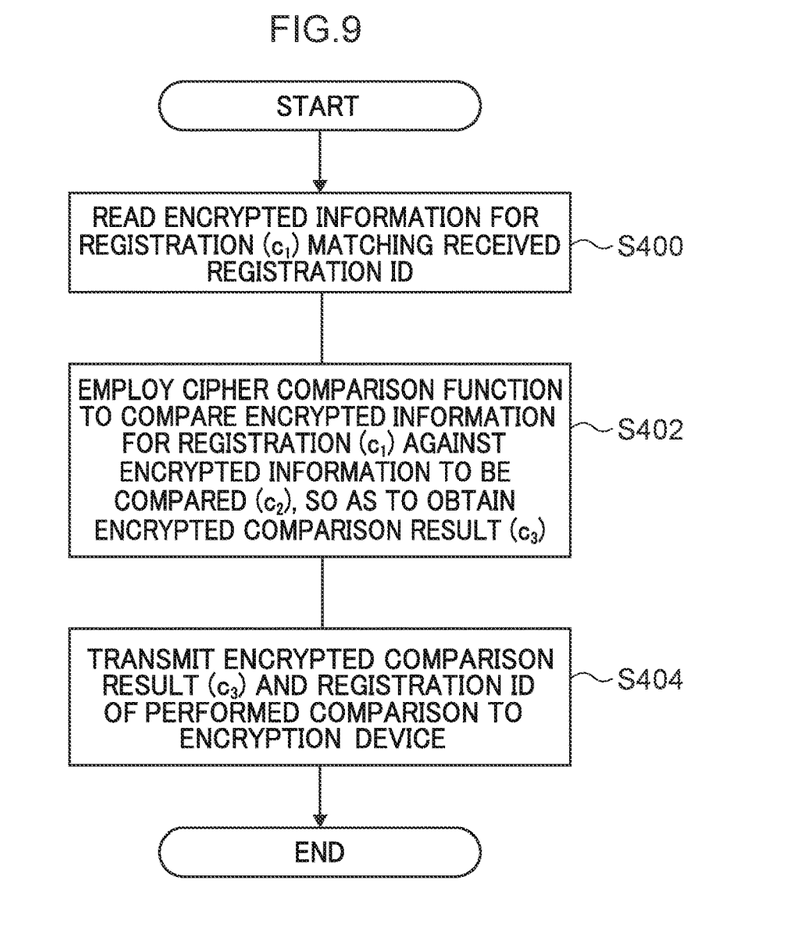
FIG. 9 is a diagram illustrating an example of a comparison processing routine of a server according to an exemplary embodiment of the present disclosure.

Explanation follows regarding the comparison processing routine of the server 6.

On receipt of the encrypted information for comparison ($c_2$) and the registration ID, together with the compare command, the server 6 executes the comparison processing routine illustrated in FIG. 9.

At step S400, the comparison section 40 reads the encrypted information for registration ($c_1$) for the record in the registration information storage section 42 having a registration ID matching the received registration ID.

At step S402, the comparison section 40 employs the cipher comparison function F for comparing encrypted information of Equation (3) to compare the read encrypted information for registration ($c_1$) against the encrypted information to be compared ($c_2$), and obtains the encrypted comparison result ($c_3$).

At step S404, the comparison section 40 transmits the encrypted comparison result ($c_3$) and the registration ID for the comparison performed to the encryption device 3, and ends processing.

As described above, the encrypted data processing system according to the first exemplary embodiment of the present disclosure is employed for access to a hotel facility and is configured including an encryption device that is installed at each room and includes an encrypting section, and a server. The encrypting section encrypts input first information based on a first encryption key so as to generate encrypted information for registration and transmits this to the server. The encrypting section also encrypts input second information based on a second encryption key so as to generate encrypted information to be compared and transmits this to the server. The server includes a comparison section that uses a cipher comparison function for comparing encrypted information to compare the encrypted information for registration against the encrypted information to be compared, and transmits a comparison result to the encryption device. The encryption device further includes a comparison result decrypting section that employs a decryption function for decrypting comparison results, and uses the first encryption key and the second encryption key to find a degree of matching between the first information and the second information. The encrypted data processing system according to the first exemplary embodiment thereby enables secrecy to be improved when comparing input information.

Configuration of Encrypted Data Processing System According to Second Exemplary Embodiment of Present Disclosure Next, explanation follows regarding the configuration of an encrypted data processing system according to the second exemplary embodiment of the present disclosure. The second exemplary embodiment will be described for an example of application to managing access to rooms in a facility such as a hotel, by reading information with a reading device provided to the door of each room, and consolidating management to a single encryption device. Similar configuration to in the first exemplary embodiment is appended with the same reference numerals and explanation thereof will be omitted.

Figure 10:
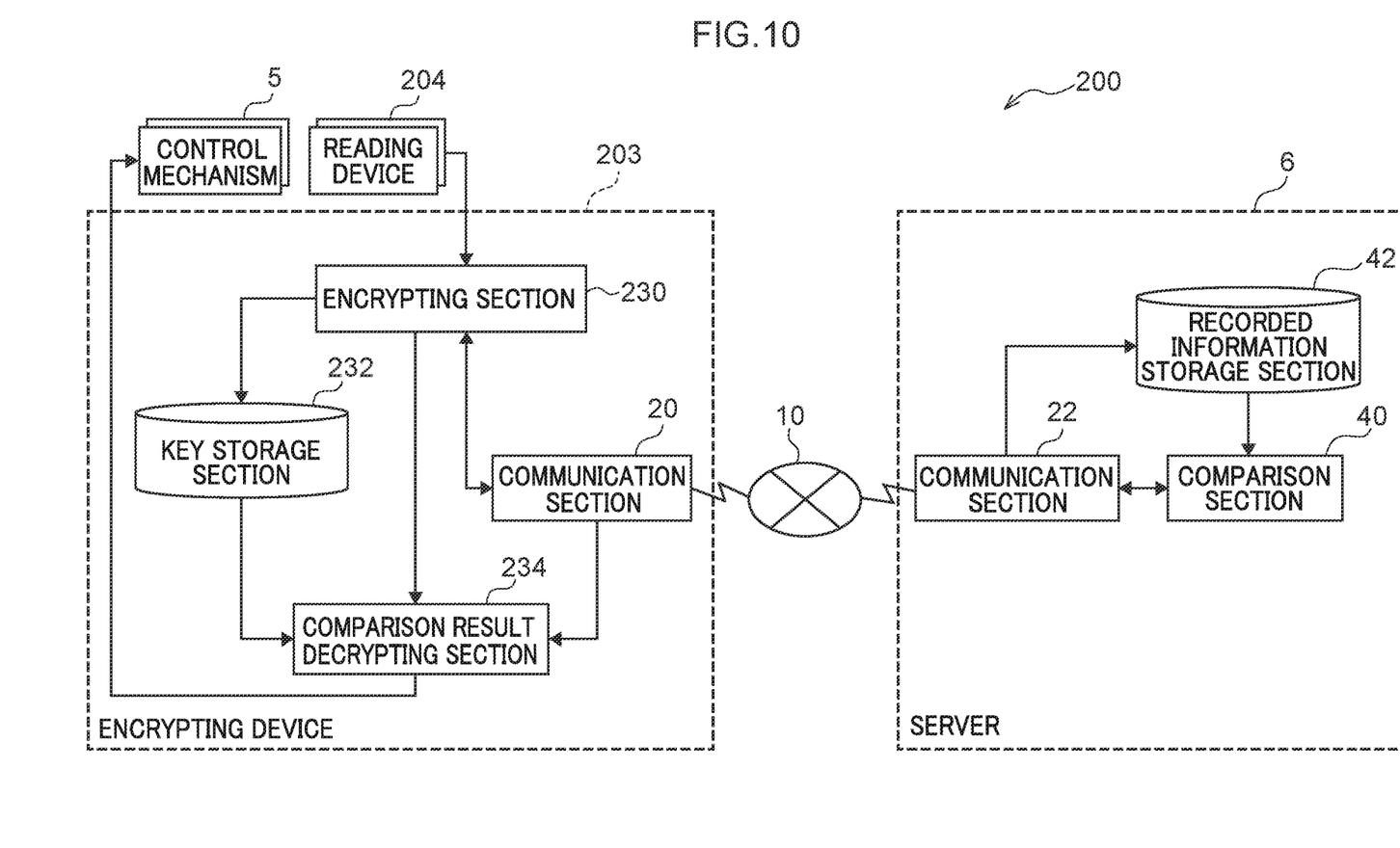
FIG. 10 is a block diagram illustrating a configuration of an encrypted data processing system according to second and third exemplary embodiments of the present disclosure.

As illustrated in FIG. 10, an encrypted data processing system 200 according to the second exemplary embodiment of the present disclosure includes reading devices 204, an encryption device 203, and a server 6 The encryption device 203 and the server 6 are connected together over a network 10 such as the Internet.

The reading devices 204 are devices respectively provided to each room for reading data on magnetic cards. When registering encrypted information, for example, staff of a hotel waves a magnetic card of a hotel user at a device that is similar to the reading device 204 and that is installed at the front desk of the hotel or the like. Information on the magnetic card (hereafter referred to as first information ($p_1$) for registration is thereby read, and the read first information ($p_1$) is associated with a room number of a room allocated to the hotel user and input to the encryption device 203. Note that, similarly to in the first exemplary embodiment, a configuration may be adopted in which an input device 2 is employed and the first information ($p_1$) and the room number are transmitted to the encryption device 203.

Moreover, when comparing encrypted information, the reading device 204 is a device installed, for example, on the door of the hotel, and a magnetic card of the hotel user is waved by the hotel user at the reading device 204, magnetic card information to be compared (hereafter referred to as second information ($p_2$) is read therefrom, and the read second information is associated with the room number and transmitted to the encryption device 203.

Note that the reading device 204 may be configured as any device that reads biometric information, an output signal from a smartphone, or the like. In such cases the information such as the biometric information, the output signal from a smartphone, or the like is transmitted to the encryption device 203 as the first information and the second information.

Next, explanation follows regarding the encryption device 203.

The encryption device 203 is configured including a communication section 20, an encrypting section 230, a key storage section 232, and a comparison result decrypting section 234.

The encrypting section 230 receives the first information ($p_1$) and the room number from the reading device 204, generates a first encryption key ($k_1$), and then based on the first encryption key ($k_1$), employs the encryption function E of Equation (1) to encrypt the first information ($p_1$) for registration read by the reading device 204 so as to generate encrypted information for registration ($c_1$). Moreover, the encrypting section 230 generates a registration ID for each registration of encrypted information. The registration ID may, for example, be generated using information corresponding to the room number when registering, such as "room number+registration number" or the like. The registration number is a number such as hashes of the read information ($p_1$), for example "A1", "A2", etc., to enable management of registrations corresponding to plural information ($p_1$) and to plural rooms. The encrypting section 230 associates the generated encrypted information ($c_1$) with a registration ID and transmits these together with a register command to the server 6. Moreover, the first encryption key ($k_1$) and the registration ID are associated with each other and saved in a storage table 232A of the key storage section 232. Note that instead of using the room number in the registration ID, the room number and a registration ID may be associated with each other and respectively saved in the key storage section 32.

Moreover, the encrypting section 230 receives the second information ($p_2$) and the room number from the reading device 204, generates a second encryption key for comparison ($k_2$), and then based on the second encryption key for comparison ($k_2$), employs the encryption function E of Equation (2) to encrypt the second information for comparison ($p_2$) read by the reading device 204 so as to generate encrypted information for comparison ($c_2$). The second encryption key for comparison is a one-time key that is only valid when performing the comparison. The encrypting section 230 associates the generated encrypted information ($c_2$) with the registration ID saved in the key storage section 32 corresponding to this room number, and transmits these together with a compare command to the server 6. The association may be performed by using a room number discernable from the registration ID. The second encryption key for comparison ($k_2$) is also saved in the key storage section 32 in a storage table 232B.

Figure 11:
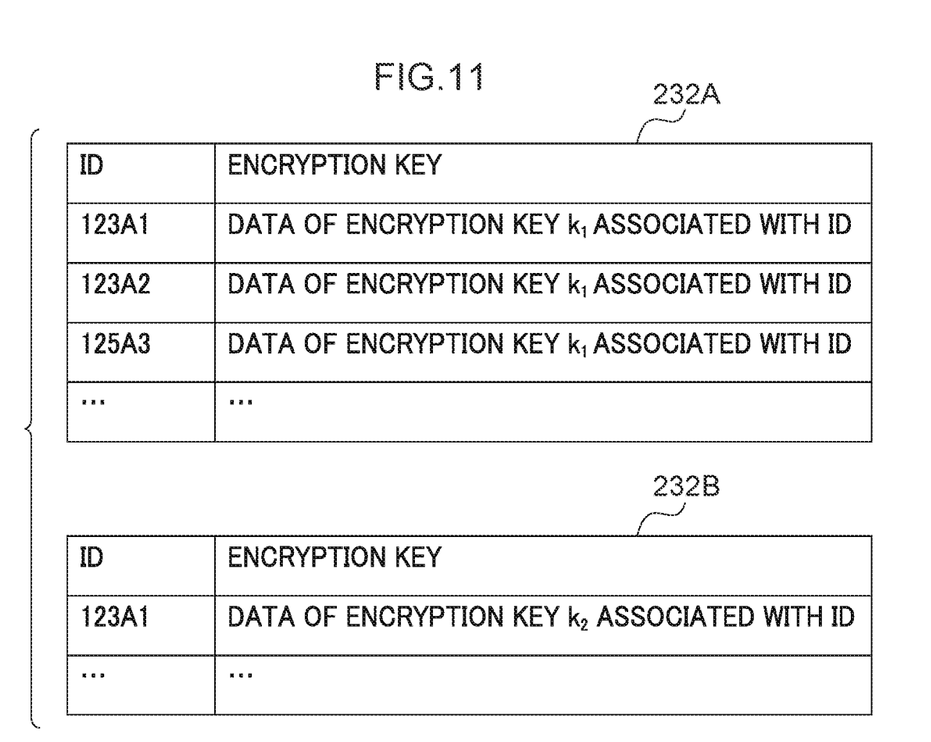
FIG. 11 is a diagram illustrating an example of information stored in a key storage section 32 of the second and third exemplary embodiments.

The key storage section 232 is a section for storing the first encryption key ($k_1$) associated with the registration ID, and the second encryption key for comparison ($k_2$). As illustrated in FIG. 11, although a similar table configuration is employed to that of the key storage section 32 of the first exemplary embodiment, in the second exemplary embodiment management of keys is performed for plural rooms.

The comparison result decrypting section 234 performs processing similar to that of the first exemplary embodiment so as to obtain a decrypted comparison result, then accordingly sends a notification to unlock to the control mechanism 5 of the room having a room number corresponding to the registration ID of the performed comparison, and the rock of the door of the room is unlocked, or sends a notification of an error thereto.

Note that other configuration of the second exemplary embodiment is similar to that of the first exemplary embodiment, and so explanation thereof will be omitted.

Operation of Encrypted Data Processing System According to Second Exemplary Embodiment of Present Disclosure Next, explanation follows regarding operation of the encrypted data processing system according to the second exemplary embodiment of the present disclosure.

In the second exemplary embodiment, on receipt of the first information ($p_1$) and the room number from the reading device 204, the encryption device 203 executes the registration processing routine illustrated in FIG. 6. Moreover, on receipt of the second information ($p_2$) and the room number from the reading device 204, the encryption device 203 executes the comparison processing routine illustrated in FIG. 7.

Note that the other operation of the second exemplary embodiment is similar to that of the first exemplary embodiment, and so explanation thereof will be omitted.

As described above, the encrypted data processing system according to the second exemplary embodiment of the present disclosure is employed for access to a hotel facility and is configured including an encryption device, which receives information from reading devices of each room and performs consolidated processing, and a server. The encrypting section encrypts input first information based on a first encryption key so as to generate encrypted information for registration and transmits this to the server, and encrypts input second information based on a second encryption key so as to generate encrypted information to be compared and transmits this to the server. The server includes a comparison section that employs a cipher comparison function for comparing encrypted information to compare the encrypted information for registration against the encrypted information to be compared, and that transmits the comparison result to the encryption device. The encryption device further includes a comparison result decrypting section that employs a decryption function for decrypting comparison results, and uses the first encryption key and the second encryption key to find the degree of matching between the first information and the second information. The encrypted data processing system according to the second exemplary embodiment of the present disclosure thereby enables secrecy to be improved when input information is being compared.

Configuration and Operation of Encrypted Data Processing System According to Third Exemplary Embodiment of Present Disclosure Next, explanation follows regarding a configuration of an encrypted data processing system according to a third exemplary embodiment of the present disclosure. The third exemplary embodiment will be described for application to a case employed for entry and exit to a meeting place such as at an event. Note that the configuration of the third exemplary embodiment is similar to that of the second exemplary embodiment illustrated in FIG. 10, and explanation follows regarding points in the third exemplary embodiment of difference thereto.

A reading device 204 is a device that is installed at an entry/exit gate and is a device that reads output information from a smartphone of an event participant. When registering encrypted information, for example, output information of the smartphone that was read by a reading device (not illustrated in the drawings) provided on the event participant-side is transmitted as first information ($p_1$) over a network 10 to an encryption device 3. Moreover, when comparing encrypted information, for example, a reading device 4 reads the output information of the smartphone of the event participant as second information for comparison ($p_2$), and transmits the read second information to the encryption device 3.

The encrypting section 230 performs similar processing to that of the second exemplary embodiment. In the present exemplary embodiment, the registration ID is an ID generated for each reception, and may, for example, be a hash of the output information of the smartphone, with the highest N digits of hashed data generated as the registration ID.

Note that other configuration and operation of the third exemplary embodiment is similar to that of the second exemplary embodiment, and so explanation thereof will be omitted.

As described above, the third exemplary embodiment of the present disclosure is an encrypted data processing system employed for entry and exit to an event space, and the encrypted data processing system provides an encrypted data processing system including a server and an encryption device connected to the server over the Internet. The encryption device includes an encrypting section that encrypts input first information based on a first encryption key so as to generate encrypted information for registration and transmits this to the server, and encrypts input second information based on a second encryption key so as to generate encrypted information to be compared and transmits this to the server. The server includes a comparison section that employs a cipher comparison function for comparing encrypted information to compare the encrypted information for registration against the encrypted information to be compared, and that transmits the comparison result to the encryption device. The encryption device further includes a comparison result decrypting section that employs a decryption function for decrypting the comparison result with the first encryption key and the second encryption key to find the degree of matching between the first information and the second information. By adopting the configuration described above, the encrypted data processing system according to the third exemplary embodiment of the present disclosure enables secrecy to be improved when input information is being compared.

As described above, by performing a comparison of information while still encrypted so as to obtain a comparison result for the still encrypted information, even if information is being acquired by transfer over a network, there is the advantage of being able to perform authorization or the like while still preserving secrecy, since the original information cannot be identified from the information that is still encrypted.

Moreover, each of the above exemplary embodiments improves convenience related to authentication of individuals while still securing security due to being able to compare information while still encrypted without decrypting and being able to utilize the comparison result in real time.

Moreover, each of the above exemplary embodiments has the advantage of being able to perform rapid authentication using encrypted information.

Explanation follows regarding a comparison of features in technology of conventional JP-A No. 2015-192446 and in the present disclosure. In the following description the technology of JP-A No. 2015-192446 will be denoted (A), and the technology of the present disclosure will be denoted (B).

Technology (A) is technology directed toward performing identification that prevents unauthorized registration. However, technology of the present disclosure (B) is technology directed toward authentication by authentication using encrypted information. While bearing in mind the different objectives as stated above, the differences of the technology (A) to the technology of the present disclosure (B) will now be described.

A summary of technology (A) will now be described. In registration processing of (A), an encryption processing device computes encrypted data C1 by a first encryption key KA1 $\wedge$ temporary key Kt $\wedge$ registration data $m_A$, and registers this in a computation device. Moreover, a determination device computes encryption key data Ek (KA2) that is a second key KA2 encrypted with the temporary key Kt, and transmits this to the computation device. The computation device then computes encrypted data C2 from the encrypted data C1 and the encryption key data Ek (KA2) and registers the encrypted data C2. Thus (A) has a feature of preventing unauthorized registration by performing registration processing in which encryption is performed using plural encryption keys. A case in which comparison processing is performed with (A) on registered information will now be described.

When comparison processing is performed with (A), the encryption processing device computes encrypted data C1' by the first encryption key KA1$\wedge$ temporary key Kt'$\wedge$ initial authentication data $M_A$, and transmits the encrypted data C1' to the computation device. The determination device computes encryption key data Ek' (KA2) that is the second key KA2 encrypted with the temporary key Kt', and transmits this to the computation device. The computation device computes encrypted data C2' from the encrypted data C1' and the encryption key data Ek' (KA2), compares the registered encrypted data C2 against the computed encrypted data C2', and determines the success or failure of authentication. By doing so there is a risk of the information of the second encryption key KA2 leaking from the determination information of the authentication by the computation device. This means that (A) is technology that merely aims to improved security related to registration, and cannot be said to be technology that addresses security related to comparison.

However, although the technology of the present disclosure (B) performs the comparison processing described above at the server, the success or failure of the comparison result is not known at the server, and the success or failure of the comparison result is found at the encryption device by using the first encryption key and the second encryption key to perform decryption of the comparison result from the server. Namely, due to the success or failure of the comparison result not being known from the comparison result by the server, there are the advantages of there being less risk of leakage of information about keys, and of being able to perform rapid authentication. The technology of the present disclosure as described above can accordingly be said to be significantly superior to the technology (A).

Note that the present disclosure is not limited to the exemplary embodiments described above, and various modifications and applications are possible within a range not departing from the spirit of the present invention.

For example, although in each of the exemplary embodiments described above examples of cases have been described in which the first information and the second information are encrypted by employing encryption function E in the encrypting section, there is no limitation thereto. For example, instead of being encrypted, hashing may be performed using a modulation code. In such cases, the cipher comparison function F of a comparison section on the server-side, and the decryption function D of the comparison result decrypting section 34 on the encryption device-side may be implemented by corresponding modulation code functions.

The entire content of the disclosure of Japanese Patent Application No. 2017-246716, filed on December 22, is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. An encrypted data processing system comprising a server and a plurality of encryption devices each connected to the server over the Internet, wherein:
   each of the encryption devices includes an encrypting section that:
      encrypts input first information based on a first encryption key so as to generate encrypted information for registration and transmits the generated encrypted information for registration to the server, and
      encrypts input second information based on a second encryption key so as to generate encrypted information to be compared and transmits the generated encrypted information to be compared to the server;
   the server includes a comparison section that receives the encrypted information to be compared from each of the encryption devices and employs a cipher comparison function for comparing encrypted information to compare the encrypted information for registration against the encrypted information to be compared, and transmits a comparison result to the respective encryption device; and each of the encryption devices further includes a comparison result decrypting section that employs a decryption function for decrypting the comparison result with the first encryption key and the second encryption key to find a degree of matching between the first information and the second information.

2. The encrypted data processing system of claim 1, wherein the second encryption key is a one-time key.

3. The encrypted data processing system of claim 1, wherein the first information and the second information are information obtained with a reading device for reading a magnetic card, biometric information, or an output signal of an information terminal.

4. The encrypted data processing system of claim 1, wherein the first information and the second information are hashed data.

5. The encrypted data processing system of claim 1, wherein:

the encrypting section of each of the encryption devices:
associates an arbitrary registration ID corresponding to the first information with the encrypted information for registration and transmits the registration ID and the associated encrypted information for registration to the server, and
associates the registration ID with the encrypted information to be compared and transmits the registration ID and the associated encrypted information to be compared to the server;

the server further includes a registration information storage section that stores the received registration ID and the received encrypted information for registration associated with each other; and the comparison section of the server reads, from the registration information storage section, the encrypted information for registration associated with the registration ID that has been associated with the received encrypted information to be compared, compares the read encrypted information for registration against the encrypted information to be compared, and transmits a comparison result to the encryption device.

6. The encrypted data processing system of claim 5, wherein:

each of the encryption devices further includes a key storage section in which the first encryption key and the second encryption key are stored associated with the registration ID; and the comparison result decrypting section employs a decryption function for decrypting the comparison result with the first encryption key and the second encryption key corresponding to the registration ID for which the comparison result was found to find a degree of matching between the first information and the second information.

7. An encrypted data processing method performed in parallel by a plurality of encryption devices at any timing, wherein each of the encryption devices:

encrypts input first information based on a first encryption key so as to generate encrypted information for registration and transmits the generated encrypted information for registration to a server;

encrypts input second information based on a second encryption key so as to generate encrypted information to be compared and transmits the generated encrypted information to be compared to the server;

receives, from the server, a comparison result from employing a cipher comparison function for comparing encrypted information to compare the encrypted information for registration against the encrypted information to be compared; and employs a decryption function for decrypting the comparison result with the first encryption key and the second encryption key to find a degree of matching between the first information and the second information.

8. One or more non-transitory media storing instructions that, when executed by one or more processors, cause the one or more processors to perform steps comprising:

receiving input first information;

receiving input second information;

encrypting the input first information based on a first encryption key;

encrypting the input second information based on a second encryption key;

generating, based on the input information and the first encryption key, encrypted registration information;

transmitting the generated encrypted registration information to a server;

encrypting input second information based on a second encryption key so as to generate encrypted comparison information and transmitting the generated encrypted comparison information to the server;

receiving, from the server, a comparison result from employing a cipher comparison function for comparing encrypted information to compare the encrypted registration information against the encrypted comparison information; and decrypting the comparison result with the first encryption key and the second encryption key to find a degree of matching between the first information and the second information.

* * * * *